US008566078B2

(12) United States Patent
Sarikaya et al.

(10) Patent No.: US 8,566,078 B2
(45) Date of Patent: Oct. 22, 2013

(54) GAME BASED METHOD FOR TRANSLATION DATA ACQUISITION AND EVALUATION

(75) Inventors: Ruhi Sarikaya, Shrub Oak, NY (US); Jiri Navratil, Cortlandt Manor, NY (US); Osamuyimen Stewart, Piscataway, NJ (US); David Lubensky, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 12/697,047

(22) Filed: Jan. 29, 2010

(65) Prior Publication Data

US 2011/0191096 A1 Aug. 4, 2011

(51) Int. Cl.

| G06F 17/28 | (2006.01) |
| G10L 15/00 | (2013.01) |
| G10L 15/26 | (2006.01) |
| G10L 15/06 | (2013.01) |
| G10L 13/00 | (2006.01) |
| G10L 13/08 | (2013.01) |
| G10L 21/00 | (2013.01) |

(52) U.S. Cl.
USPC ........ 704/4; 704/2; 704/3; 704/231; 704/235; 704/243; 704/258; 704/260; 704/270; 704/270.1; 704/275; 704/277

(58) Field of Classification Search
USPC .......... 704/2, 3, 4, 231, 235, 260, 270, 270.1, 704/275, 277, 243, 258; 434/156, 353
See application file for complete search history.

(56) References Cited

U.S. PATENT DOCUMENTS

| 5,408,410 | A | | 4/1995 | Kaji |
| 6,061,646 | A | * | 5/2000 | Martino et al. .................. 704/3 |
| 6,161,082 | A | * | 12/2000 | Goldberg et al. ................. 704/3 |
| 7,505,893 | B2 | | 3/2009 | Mizutani et al. |
| 7,580,828 | B2 | * | 8/2009 | D'Agostini ...................... 704/2 |
| 7,689,404 | B2 | * | 3/2010 | Khasin ............................ 704/1 |
| 7,752,034 | B2 | * | 7/2010 | Brockett et al. ................. 704/9 |
| 7,908,132 | B2 | * | 3/2011 | Brockett et al. ................. 704/9 |
| 7,930,719 | B2 | * | 4/2011 | Ellis et al. ...................... 725/38 |
| 7,949,517 | B2 | * | 5/2011 | Eckert et al. .................... 704/8 |
| 8,065,134 | B2 | * | 11/2011 | Naito et al. ..................... 704/8 |
| 8,069,030 | B2 | * | 11/2011 | Iso-Sipila et al. ................ 704/3 |
| 8,069,031 | B2 | * | 11/2011 | Gelbman ......................... 704/3 |

(Continued)

OTHER PUBLICATIONS

Wang Chao et al., "High-quality speech translation in the flight domain", Interspeech 2006 ICLSP v2 2006; pp. 761-764; Sep. 17-Sep. 21, 2006.

(Continued)

*Primary Examiner* — Edgar Guerra-Erazo
(74) *Attorney, Agent, or Firm* — Anne V. Dougherty, Esq.; McGinn IP Law Group, PLLC

(57) ABSTRACT

A method of generating a statistical machine translation database through a game in which a monolingual structure is provided to a plurality of players. A first translation attempt is received from each of the plurality of players. The first translation attempt from each of the plurality of players is compared. Feedback is provided to each of the plurality of players and the attempts are received and compared to provide feedback to iteratively converge subsequent translations from each of the plurality of players into a final translated structure.

22 Claims, 7 Drawing Sheets

(56) References Cited

U.S. PATENT DOCUMENTS

| | | | |
|---|---|---|---|
| 2002/0165708 A1* | 11/2002 | Kumhyr | 704/8 |
| 2003/0009320 A1* | 1/2003 | Furuta | 704/2 |
| 2003/0176995 A1* | 9/2003 | Sukehiro | 704/2 |
| 2004/0044517 A1* | 3/2004 | Palmquist | 704/7 |
| 2004/0122678 A1* | 6/2004 | Rousseau | 704/277 |
| 2004/0167768 A1* | 8/2004 | Travieso et al. | 704/2 |
| 2004/0172257 A1* | 9/2004 | Liqin et al. | 704/277 |
| 2004/0243392 A1* | 12/2004 | Chino et al. | 704/7 |
| 2005/0021322 A1* | 1/2005 | Richardson et al. | 704/2 |
| 2005/0137854 A1 | 6/2005 | Cancedda et al. | |
| 2005/0192095 A1* | 9/2005 | Cheng | 463/35 |
| 2005/0225030 A1* | 10/2005 | Baldry | 273/248 |
| 2006/0116865 A1* | 6/2006 | Cheng et al. | 704/2 |
| 2007/0050182 A1 | 3/2007 | Sneddon et al. | |
| 2007/0122792 A1* | 5/2007 | Galley et al. | 434/353 |
| 2007/0294076 A1* | 12/2007 | Shore et al. | 704/2 |
| 2008/0082315 A1 | 4/2008 | Shimohata et al. | |
| 2008/0270112 A1 | 10/2008 | Shimohata et al. | |
| 2009/0083024 A1* | 3/2009 | Suzuki et al. | 704/4 |
| 2009/0119091 A1* | 5/2009 | Sarig | 704/2 |
| 2009/0204387 A1* | 8/2009 | Okada | 704/3 |
| 2010/0311030 A1* | 12/2010 | He et al. | 434/350 |
| 2011/0097693 A1* | 4/2011 | Crawford | 434/157 |
| 2012/0141959 A1* | 6/2012 | von Ahn Arellano et al. | 434/157 |

OTHER PUBLICATIONS

Kaji, et al., "Unsupervised Word Sense Disambiguation Using Bilingual Comparable Corpora", Hitachi, Ltd.; ACM Digital Library 2001, pp. 1-10.

Gao, et al., Statistical Query Translation Models for Cross-Language Information Retrieval, ACM Digital Library, Dec. 2006; pp. 323-359.

\* cited by examiner

GAME BASED METHOD FOR TRANSLATION DATA ACQUISITION AND EVALUATION

BACKGROUND OF THE INVENTION

1. Field of the Invention

The present invention generally relates to a method and apparatus for building a statistical machine translation (SMT) system, and more specifically to a SMT system for data collection and acquisition that utilizes a translation game played by multilingual people.

2. Description of the Related Art

Conventional statistical machine translation (SMT) systems rely on manually translated bilingual data where a given sentence/phrase in the source language is translated to a target language. Translation of sentence pairs is the most time-consuming part of building a conventional SMT system, as the translation of sentence pairs depends on human labor. At best, only a few human translators are available to translate large quantities of data for the translation of sentence pairs. Furthermore, a lack of translators can be a bottle neck in translation data collection because there are too few people to translate the sentences. In addition, for some languages, it is conventionally difficult to find bilingual speakers in some exotic languages because there are few of them available.

In conventional phrase based statistical machine translation (SMT) systems, estimates of conditional-phrase-translation probabilities are the major source of translation knowledge. The phrase pair extraction is based on an automatically word-aligned corpus of bilingual sentence pairs. In conventional phrase based SMT systems, every possible phrase pair, up to a pre-defined phrase-length with the following constraints, are extracted: phrases must contain at least one pair of linked words and phrases that must not contain any words that have links to other words not included in the phrase pair.

The practical issues for developing a parallel corpora include: 1) lack of experienced bilingual speakers in the language-pair of interest, 2) costs associated with translating each sentence, and 3) time required to translate these sentences. These issues have a major impact on the development cycle of conventional SMT systems.

SUMMARY OF THE INVENTION

In view of the foregoing, and other, exemplary problems, drawbacks, and disadvantages of the conventional systems, it is an exemplary feature of the present invention to provide a method of generating a statistical machine translation database through a game, the method includes retrieving from memory and providing to a plurality of players a monolingual structure, receiving a first translation attempt from each of the plurality of players, comparing, using a processor, the first translation attempts from each of the plurality of players, providing feedback to each of the plurality of players, and receiving and comparing attempts and providing feedback to iteratively converge subsequent translations from each of the plurality of players into a final translated structure.

Another exemplary feature of the present invention would be a method of generating alternate translations for a statistical machine translation database through a game, the method including providing a monolingual structure to a player, receiving a first translation attempt from the player, comparing, using a processor, the first translation attempt from the player to a reference translation, providing feedback to the player, and receiving and comparing attempts and providing feedback to iteratively converge subsequent translations from the player into a final translated structure.

Another exemplary feature of the present invention would be a method of grading a statistical machine translation database through a game, the method including providing a monolingual structure to a plurality of players, receiving a grading assessment of the monolingual structure from each of the plurality of players, comparing, as executed by a processor, the grading assessment from each of the plurality of players, and providing feedback to each of the plurality of players, and receiving and comparing attempts and providing feedback to iteratively converge subsequent translations from each of the plurality of players into a final grading assessment.

Another exemplary feature of the present invention would be an apparatus to generate a statistical machine translation database through a game, the apparatus including a monolingual database to store a plurality of language phrases first language and a game manager, as executed by a processor on the apparatus, configured to receive a source language phrase from the monolingual database and present the source language phrase to each of a plurality of players and to receive translation attempts from each of the plurality of players. The game manager provides feedback to each of the plurality of players and receives and compares attempts and provides feedback to iteratively converge subsequent translations from each of the players into a second language phrase.

The invention exemplarily provides games that would entice users to produce parallel sentences. The games turn the laborious and boring task of a translation process into something fun where users would enjoy playing the exemplary games. While doing so, the users would translate sentences from one language to the other in the process.

An additional benefit of the present invention would be providing low cost parallel corpora.

BRIEF DESCRIPTION OF THE DRAWINGS

The foregoing and other purposes, aspects and advantages will be better understood from the following detailed description of an exemplary embodiment of the invention with reference to the drawings, in which.

DETAILED DESCRIPTION OF EXEMPLARY EMBODIMENT OF THE INVENTION

Figure 1:
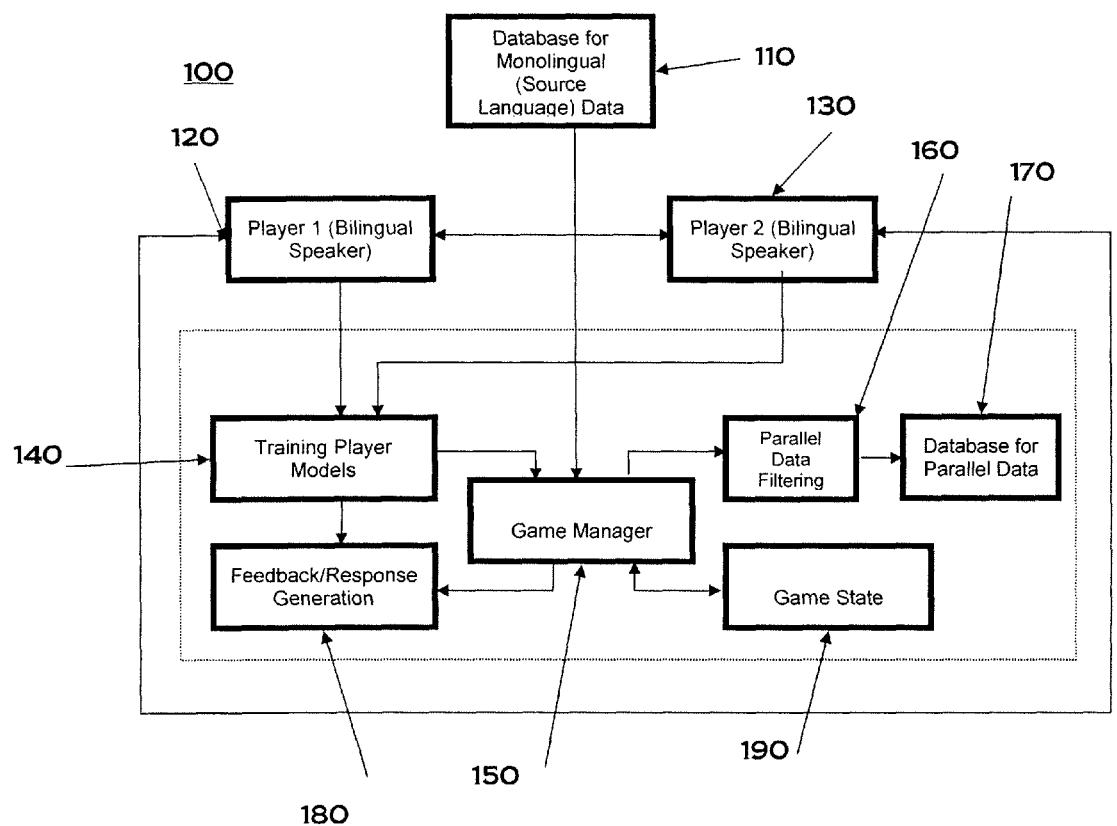
FIG. 1 illustrates an exemplary system 100 to acquire parallel data to train statistical machine translation systems.

Referring now to the drawings, and more particularly to FIGS. 1-7, there are shown exemplary embodiments of the method and structures according to the present invention.

Collectively, the exemplary games and processes would provide a fast, cheap, and high quality parallel corpora generation method, which would enable rapid SMT deployment in different languages and domains. In particular, the invention would exemplarily be presented as a game in which one or more players compete and, in doing so, provide high quality parallel corpora. Exemplarily, players would be bi-lingual and would play the game for either fun or prizes.

In the first exemplary embodiment, two or more human players would login into a website with a username where they play the game. Some embodiments of the game require an infra-structure where two or more players can play an internet game jointly. FIG. 1 illustrates an exemplary system 100 game to acquire parallel data to train statistical machine translation systems according to the first embodiment. Referring to FIG. 1, a source language is stored in a database for monolingual data 110. That is, database for monolingual data 110 stores the source language which is the language of which a translation is desired. The translation would be parallel data, showing a parallel translation of the phrase or sentence in the second language.

Game manager 150 exemplarily controls the game and receives a desired source language from a database for monolingual data 110.

Player 1 120 and Player 2 130 would be exemplarily be bilingual persons that would play the game and their play would help develop the parallel data. Preferably, Player 1 120 and Player 2 130 would be provided with an interface with which they can communicate with the system 100. The interface may be a web browser or even a written sheet through which they can observe the object to be translated and any clues or instructions from the game.

The human players, in the first embodiment two players: Player 1 120 and Player 2 130, would be presented with a monolingual structure (typically a sentence, but the structure may also be a phrase, word, or document) in the source language by game manager 150. The players would take turns to translate the sentence, but their translations would not be displayed to the other players until they generate the same translation.

The game would exemplarily provide clues to help both players converge onto the same translation. For example, while translating the sentence, the players would be informed about whether their translation is a hit or miss compared to other players' translations. The players would iteratively translate the sentence until they generate the same translation or until they reach a predefined turn count.

In the first embodiment of the game, the users would be presented with the same sentence and are then asked to translate the sentence. The task of sentence translation can also include the alignments (i.e. word-by-word alignments of the words in the original sentence and its translation).

Training player models unit 140 would use the translated sentence pairs to train-up a player-pair model. The player-pair training involves learning a model from the player inputs. The model would be updated with each response pair from the players and used to steer the players towards converging a common translation answer for a given monolingual structure. The model is trained using such information as sentence-pairs, e.g., sentence comparison results, a number of turns a translation took to converge, and progress in converging to a common translation, as well as other player specific information if available (e.g. gender, language proficiency, etc.,).

The player pair model would generate a set of information including the similarity of the translated sentences using such metrics as BLEU (Bilingual Evaluation Understudy), TER, NIST etc., whether the players are co-operating, and a number of turns taken by each player, and a convergence rate to a common translation. Exemplarily, the automatic evaluations (both BLEU and NIST) use a weighted average of variable length phrase matches against the reference translations. This information is communicated to the Game Manager 150 and Feedback/Response Generation Unit 180 to formulate the response to the players following their input.

BLEU refers to a conventional evaluation of translations. See Kishore Papineni, Salim Roukos, Todd Ward, and Wei-Jing Zhu, Bleu: a Method for Automatic Evaluation of Machine Translation, Proceedings of the 40th Annual Meeting of the Association for Computational Linguistics (ACL), Philadelphia, July 2002, pp. 311-318. For NIST, the National Institute of Standards and Technology's effort at open source translation, refer to the NIST Report (2002) Automatic Evaluation of Machine Translation Quality Using N-gram Co-Occurrence Statistics.

Game Manager 150 would take the information from training player models unit 140 along with the monolingual sentence to instruct the response generation unit 180. Response generation unit 180 exemplarily formulates a response to the players with information received the training player models unit 140. The information supplied by the training player models unit 140 includes the translation similarity score (suggesting how close the two players are in generating the same translation) and clues (e.g. communicating one player's partial translations or translation of the same random word(s) to the other) to make sure that eventually the players converge to the same translation. Ideally, the threshold for convergence would be a score of 1.0, an exact score match.

In the first exemplary embodiment, the players may be rewarded in pairs. The rewarding process can be implemented in many ways, including a minimum turn count in translating a given set of sentences or an amount of time required to translate a given set of sentences. In the first embodiment, the stopping criterion is that for each sentence pairs the players have to converge on the same translation.

Game state unit 190 would keep track of the status of the translation efforts by the players. In additional aspects of the first embodiment, Game State Unit 190 would keep track of the game state to make sure that the players do not diverge in their respective translations and that the players will keep trying a given sentence pair up to a predefined turn count.

In the first embodiment, each sentence generated in each turn is a possible translation of the original sentence. These translations would be filtered by a parallel data filtering unit 160 to make sure that the data is useful for translation and they would be placed in the parallel data database 170. That is, the filtered parallel data may include alternative translation pairs that would also be useful for translation purposes.

Figure 2:
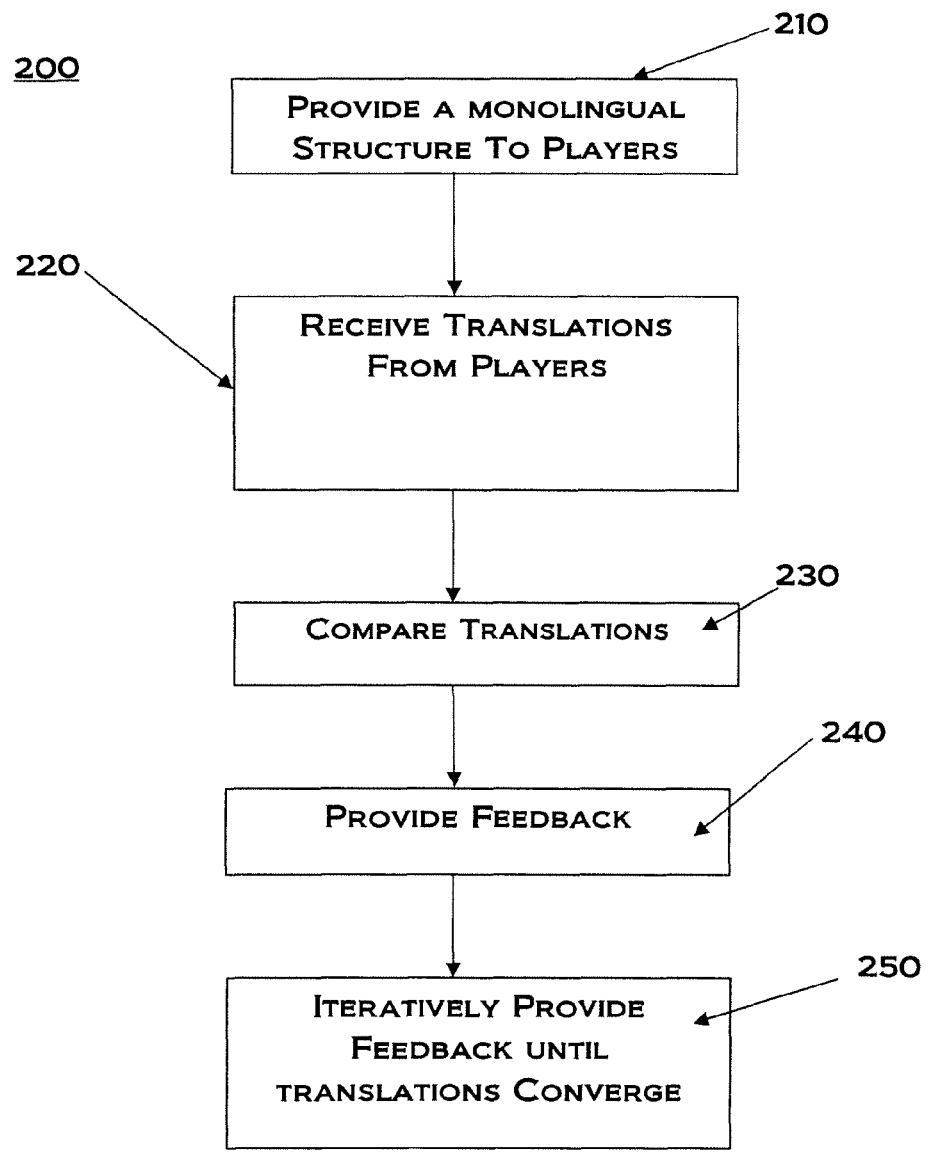
FIG. 2 illustrates an exemplary method 200 for acquiring parallel data.

FIG. 2 illustrates an exemplary method 200 of the first embodiment. Referring to FIG. 2, method 200 exemplarily begins at Step 210 where a monolingual structure is provided to players. Then, in Step 220, the translations, or parallel data, are received and then compared in Step 230. In step 240, feedback is provided to the players. Step 250 illustrates that the method 200 is iteratively performed until the translations converge or that other end conditions are reached.

The following is an exemplary embodiment of the translation of a sentence from Turkish to English in the first embodiment of the game. The portion detailing "System Action," corresponds to decisions and outputs made by an exemplary embodiment of the present game.

System Action: The players are instructed to translate the following Turkish sentence to English: "Bugun olmazsa verdiginiz isi bir sonraki gune kesin bitiririm".

Turn #:1

Player 1's First Attempt: If it is not today, I can definitely finish the work you gave me by tomorrow Player 2's First Attempt: In case I may not be able to finish the assignment today, I can definitely complete it the following day System Action: Try Again!

System Action: Bleu Score Between Translation Pairs: 0.1524 (communicated to both players)

System Comment: Rephrase your translation or use synonyms if possible for some words (communicated to both players).

System Action: Clue: Try to use a word(s) that would mean "tomorrow" (communicated to Player 2). Try to use a word that would mean "complete" (communicated to Player 1).

That is, as the turn counts increases, the amount of clues given to the players increases. At each turn, the overlap between the two translations and differences between the two translations are estimated. For example, after 2 turns (each player attempts to match each other's translation twice), the method can identify content words and if any/some of these content words are missing in a translation. If there are missing words from one player's respective translation, then a clue would be given to the player who did not use the same content word, in the form of "use a synonym for this specific content word." As the turn count increases, then phrases used in the other translation are presented to the other player. The amount of clues given can be adjusted to pace the convergence on the same translation.

That is, because there may be no database available to which the player's translations can be compared, the translations are compared against each other. The players may then be provided with additional hints or warnings about words that do not correspond between their translations. Exemplarily, where a word does not match, the players are offered alternatives based on the other player's translation attempt or known synonyms.

Turn #2

Player 1's Second Attempt: If it is not today, I can definitely complete the work you gave me by tomorrow Player 2's Second Attempt: If I cannot finish the assignment today, I will definitely be able to complete it tomorrow System Action: Getting close! try again!

System Action: Bleu Score Between Translation Pairs: 0.0116 (communicated to both players).

System Comment: Rephrase some of the constructs or use synonyms if possible for some words (communicated to both players)

System Action: Clue: Try to use a word(s) that would mean "work" (communicated to Player 2)

Turn #3

Player 1's Third Attempt: If it is not today, I can definitely complete the work you gave me by tomorrow.

Player 2's Third Attempt: If I cannot finish the work today, I will definitely be able to complete it tomorrow System Action: Getting very close! try again!

System Action: Bleu Score Between Translation Pairs: 0.0142 (communicated to both players).

System Comment: Check the partial translation of the other player and rephrase your translation (for either of the player, say Player 1 for example):

System Action: Clue: If I cannot _____ _____ work today, I will _____ _____ able to _____

Turn #4

Player 1's Fourth Attempt: If I cannot finish the work today, I will definitely be able to complete it tomorrow.

Player 2's Fourth Attempt: If I cannot finish the work today, I will definitely be able to complete it tomorrow System Action: Congratulations!!!!

System Action: Bleu Score Between Translation Pairs: 1.0 (communicated to both players).

System Action: System Report: "It took you 4 turns and 24 seconds to converge to the same translation. You got X points for translating this sentence. Please move on to the next sentence."

Next, all seven sentence-pairs (original Turkish sentence is paired with the three pairs of translations generated with both players) generated in the process would be considered legitimate and be deposited to the Parallel Sentence Pair Database.

A second exemplary embodiment of the game would exemplarily be similar to the first embodiment. In the second embodiment, the translation answer of one of the players (or one that is extracted from an already existing parallel corpus) would be fixed or constant. As such, the second embodiment of the game would steer the other player to converge to the fixed translation answer that exists in the database.

The second embodiment would exemplarily be based where a parallel corpora already exists. The existing parallel corpora could be generated manually by human translators or by the first game. The goal of the second embodiment of the game is to generate alternate translations for each sentence in the existing parallel corpora.

In the second embodiment of the game, only one player would play the game. The second embodiment would arise in an instance, for example, where some parallel corpora was already collected in some fashion and the goal is to acquire additional data in the form of alternative translations of the available parallel corpora.

Figure 3:
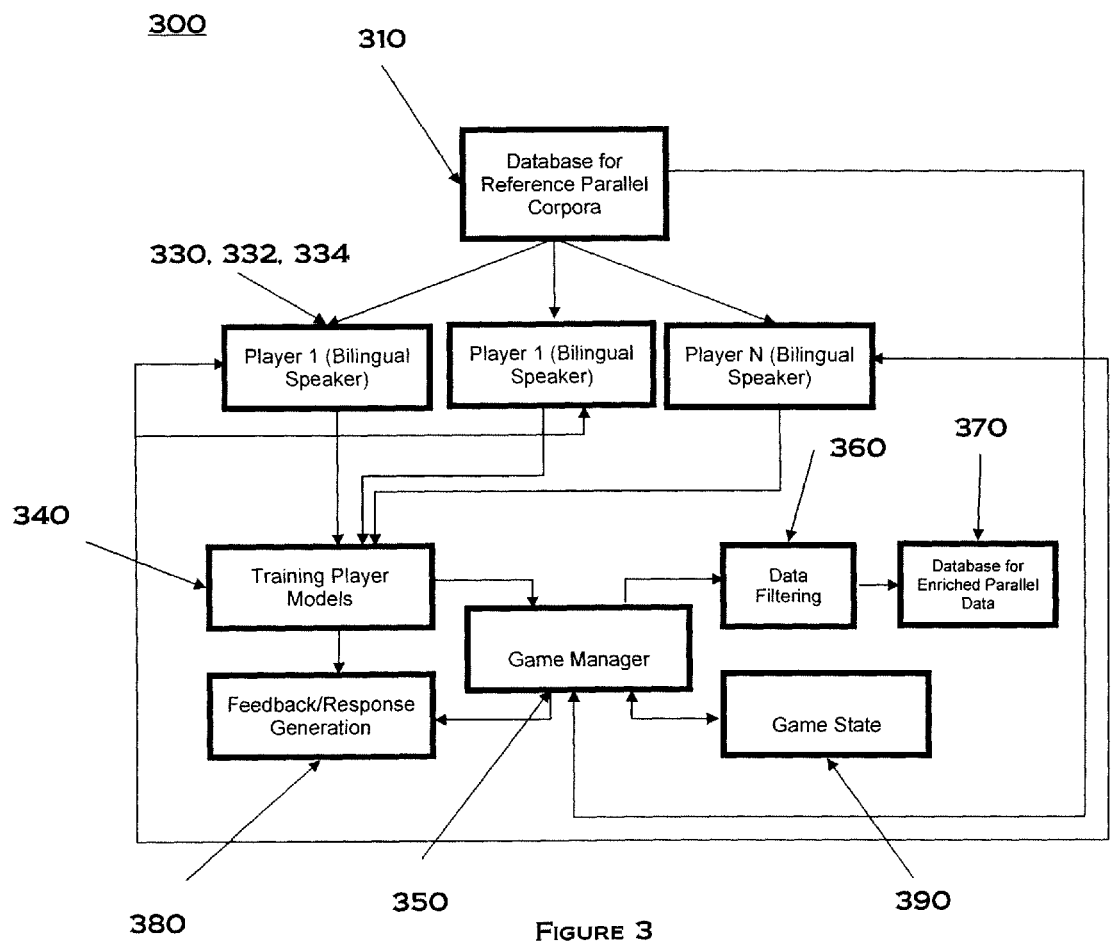
FIG. 3 illustrates an exemplary system 300 to acquire parallel data to train statistical machine translation systems.

FIG. 3 illustrates an exemplary system game 300 to acquire parallel data to train statistical machine translation systems. Referring to FIG. 3, system 300 includes a database for reference parallel corpora 310. Monolingual data is retrieved from database 310 and provided to bilingual human players player 1 330, player 2 332, through player N 334. Similar to the exemplary system 100 of FIG. 1, training player models unit 340, game manager 350, parallel data filtering unit 360, data base for parallel data 370, and feedback/response generation unit 380 are similarly provided.

In the second embodiment, the player would exemplarily log into a website with a username and be presented with a sentence to translate. The player then translates the sentence until the player can match the translation of that sentence in the parallel corpus. The game may exemplarily give clues such as randomly displaying one or more words in the reference translation to ensure that the player converges to the reference translation stored in the parallel corpus.

This second embodiment of the game would exemplarily present the players with monolingual data, which is extracted from the parallel corpora database 310. The monolingual data could be from each direction (e.g. source or target languages).

Figure 4:
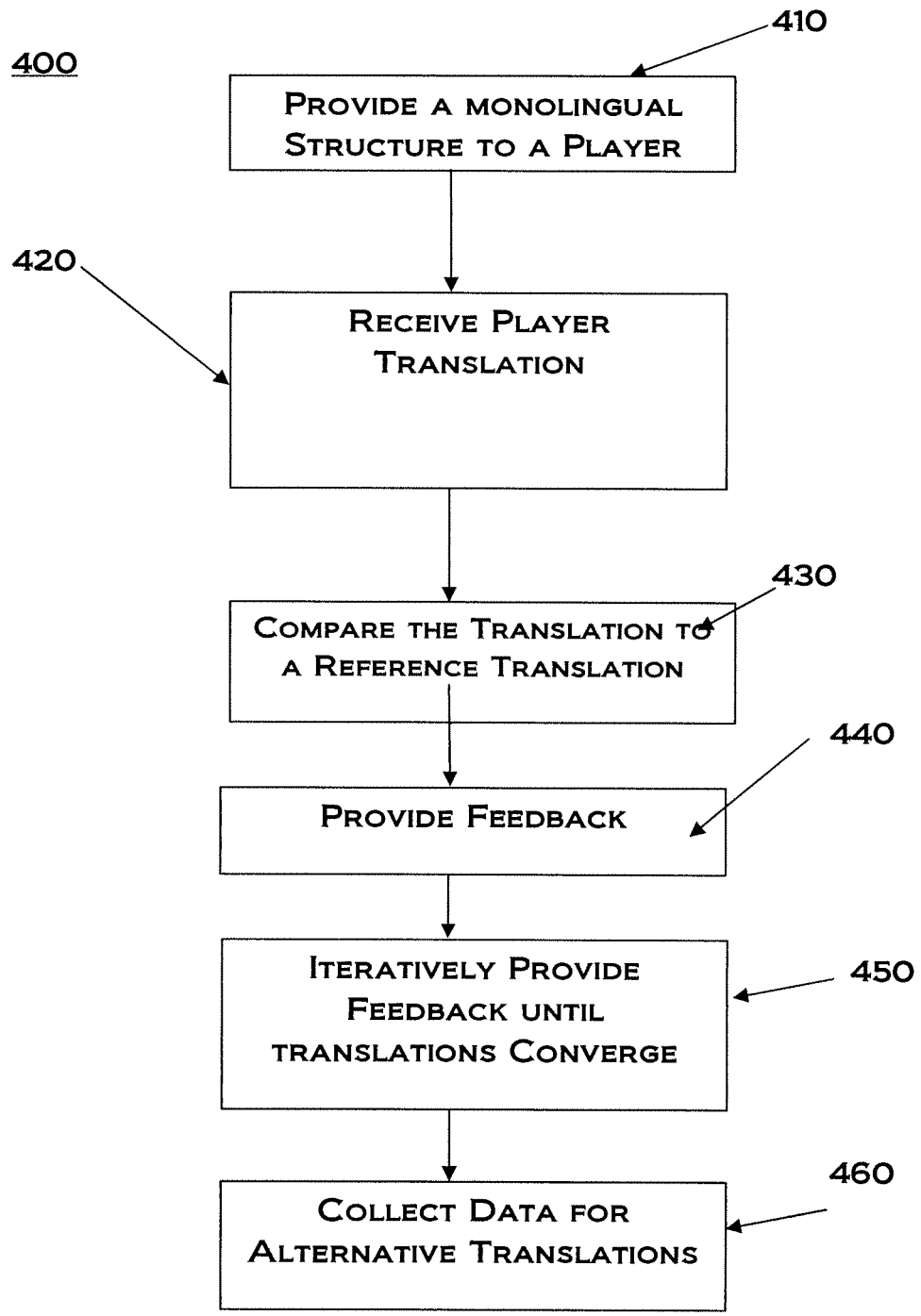
FIG. 4 illustrates an exemplary method 400 for acquiring parallel data according to system 300.

FIG. 4 illustrates an exemplary method 400 of the second embodiment. Referring to FIG. 4, method 400 exemplarily begins at Step 410 where a monolingual structure is provided to a player. Then, in Step 420, a translation is received from the player and then compared to a reference translation in Step 430. In step 440, feedback is provided to the player. Step 450 illustrates that the method 400 is iteratively performed until the translation converges with the reference or until other end conditions are reached.

In step 440, the feedback could exemplarily be based on taking the translated sentences and train up a player-pair (if there are more players then the model is a multi-player model) model. The player-pair training involves learning a model from the player inputs. The model is updated with each response pair from the players and is used to steer the players towards converging a common translation answer for a given monolingual sentence. The model is trained using such information as sentence comparison, turns it took so far and progress in converging to a common translation as well as other player specific information if available (e.g. gender, language proficiency, etc.). In an additional exemplary embodiment, multiple players could race to translate the same fixed translation.

The player pair model generates a set of information including, the similarity of the translated sentences using such metrics as BLEU, TER, NIST etc., which are well known metrics in the art, whether the players are co-operating, # of turns each player took, and convergence rate to a common translation. This information is communicated to the Game Manager 350 and Training/Player Model 340 to formulate the response to the players following their input.

One of the main differences with the first embodiment is that, in the second embodiment, the translated sentences are not compared to each other but they are compared to a reference translation in the database in Step 430. The reference translations are extracted from the parallel corpora.

Step 440 can further include giving clues to help the player merge his translation to the proper translation in an iterative fashion as illustrated in Step 450. Furthermore, in Step 460, all the data collected from the player can be considered as alternative translations of the same source language sentence.

All the sentences collected this way are considered (after some quality assessment, and filtering) as alternative translations of the sentences in the parallel corpus. Typically, one can come up with numerous sentences in the target language to convey the same meaning in the source language. In this embodiment, the game would not require sophisticated infrastructure, since it simply uses a table lookup on one side.

This second embodiment of the game would exemplary includes Game Manager 350 that would take the information from the Training/Player Model 340 along with the monolingual sentence and instruct a Feedback/Response Generation unit 380. Feedback/Response Generation unit 380 would exemplarily formulate a response to the players with information it received from Training/Player Model 340. The information supplied by Training/Player Model 340 would exemplarily include the translation similarity score (suggesting how close the two players are in generating the same translation) and clues (e.g. communicating one player's partial translations or translation of the some random word(s) to the other) to make sure that eventually the players generate the reference translation in the database.

This second embodiment of the game would exemplary reward the players individually. The rewarding process may be implemented in many ways, including minimum turn count in translating a given set of sentences, or in terms of time taken to translate a given set of sentences. Exemplarily, for the second embodiment, the stopping criterion would be that each sentence has to converge on the reference translations.

Game state unit 390 of the second embodiment of the game would exemplary keep track of the game state, to make sure that the players do not diverge in translations and they can keep trying up to a predefined turn count.

In the second embodiment of the game, each sentence generated for each turn may be the possible alternate translation of the original sentence. These translations would be filtered to make sure that the data is clean/useful for translation and put them into the enriched parallel data database through data filtering unit 360 and stored in parallel database 370. One exemplary method of filtering is to compare a translation to other translations of the same sentence by different players. This comparison can exemplarily employ BLEU, NIST or any other sentence comparison metrics. These metrics can measure overlap between two sentence pairs. If a translation does not have any overlap or a very small overlap with the other translations (there is threshold involved here, which could be set to a low value), then this translation is an outlier and should exemplarily be filtered out and should not be included in the parallel data.

A third exemplary embodiment of the game would also use human computing power to rate the quality of translated sentences. The third embodiment can be played by one or more players (similar to the two games described above). When the third embodiment is played by two or more players each player is presented by the source sentence and its translation. The players are asked to rate the quality of translations according to a scale (e.g., 1-to-10). The players would keep guessing/rating the quality until they have matching answers. Again the players would be rewarded/punished based on a number of turns they used to match their answers. The data collected here are used to assign a confidence score to the translations.

Figure 5:
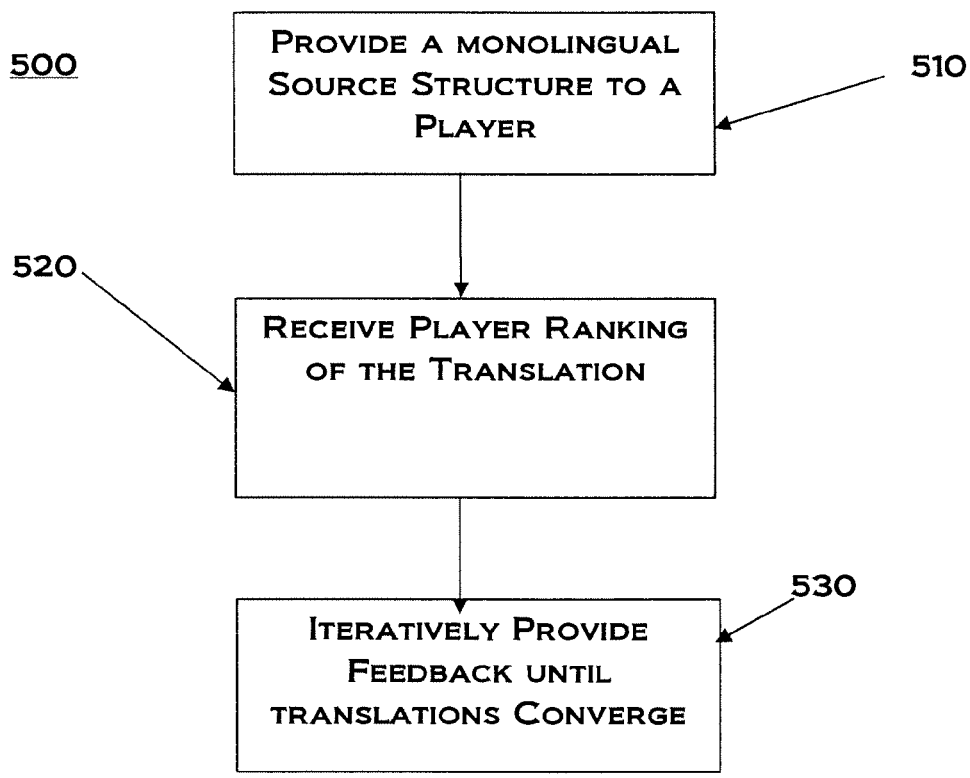
FIG. 5 illustrates an exemplary method 500 for ranking parallel data.

FIG. 5 illustrates an exemplary method 500 of the third embodiment. Referring to FIG. 5, method 500 exemplarily begins at Step 510 where a monolingual source structure is provided to players. Then, in Step 520, the player rankings of the translation are received. In Step 530, player feedback is iteratively requested until the rankings between players converge or that other end conditions are reached.

This game can also be played by a single player, assuming that there exist one or more ratings of the translated sentences. The third embodiment would be used to obtain a more reliable quality assessment of the translations by incorporating opinions of the other human translators about the quality of the translations.

In the different embodiments of the game, the users would exemplarily be rewarded (e.g. giving points) as they match the translations. In some instances, these points could be redeemed for other prizes.

Figure 6:
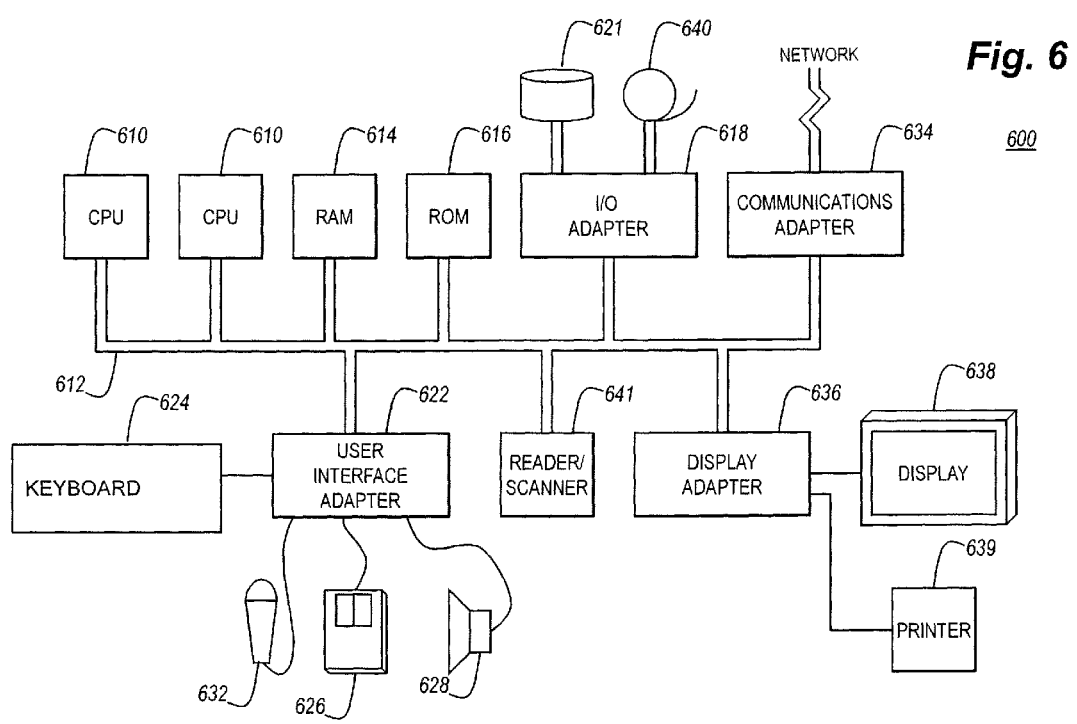
FIG. 6 illustrates a typical hardware configuration 600 which may be used for implementing the computer system and method according to the exemplary aspects of the present invention.
Figure 7:
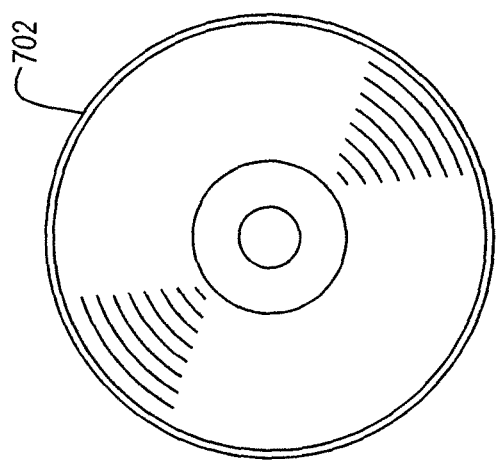
FIG. 7 illustrates an exemplary CD 702 and magnetic data storage diskette 700 to exemplarily store the method 200.
Figure 7:
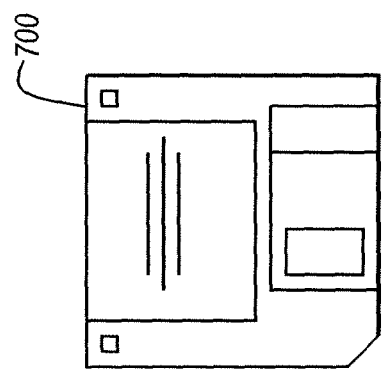

Referring now to FIG. 6, system 600 illustrates a typical hardware configuration which may be used for implementing the inventive system and method for generating SMT's. The configuration has preferably at least one processor or central processing unit (CPU) 610. The CPUs 610 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, and Intranet, a personal area network (PAN), etc., and a display adapter 636 for connecting the bus 612 to a display device 638 and/or printer 639. Further, an automated reader/scanner 641 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of tangible signal-bearing storage media.

Thus, this aspect of the present invention is directed to a programmed product, comprising signal-bearing storage media tangibly embodying a program of machine-readable instructions executable by a digital data processor incorporating the CPU 610 and hardware above, to perform the method of the invention.

This tangible signal-bearing storage media may include, for example, a RAM contained within the CPU 610, as represented by the fast-access storage for example. Alternatively, the instructions may be contained in another signal-bearing storage media, such as a magnetic data storage diskette 700 or CD-ROM 702, (FIG. 7), directly or indirectly accessible by the CPU 610.

Whether contained in the computer server/CPU 610, or elsewhere, the instructions may be stored on a variety of tangible, machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable tangible signal-bearing storage media, including memory devices in transmission media and instructions in formats such as digital and analog and memory devices in communication links and wireless. In an illustrative embodiment of the invention, the machine-readable instructions may comprise software object code, complied from a language such as "C," etc.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of generating a statistical machine translation database through a game, the method comprising:
   retrieving from memory and providing to a plurality of players a monolingual structure;
   receiving a first translation attempt from each of the plurality of players;
   comparing, using a processor, the first translation attempts from each of the plurality of players;
   providing feedback to each of the plurality of players; and
   receiving and comparing attempts and providing feedback to iteratively converge subsequent translations from each of the plurality of players into a final translated structure.

2. A method as recited in claim 1, further comprising filtering parallel data for useful intermediate translation data.

3. A method as recited in claim 1, wherein the monolingual structure comprises a sentence formed in a first language.

4. A method as recited in claim 1, wherein the final translated structure comprises a sentence formed in a second language.

5. A method as recited in claim 1, wherein the comparing includes determining a similarity score for translation attempts of each of the plurality of players.

6. A method as recited in claim 5, wherein said providing feedback comprises formulating a response to the players includes the similarity score and a partial translation of same random words from another one of the plurality of players from the translation attemts.

7. A method as recited in claim 1, wherein the providing feedback includes presenting similar words based on a preceding translation attempt of one player of the plurality of players and a preceding translation attempt of an other player of the plurality of players to a respective one of the plurality of players with respect to portions of the respective translation attempts that do not converge to a common translation answer for the monolingual structure.

8. A method as recited in claim 1, wherein the providing feedback includes presenting selected words based on a preceding translation attempt of one player of the plurality of players and a preceding translation attempt of an other player of the plurality of players to a respective one of the plurality of players with respect to portions of the respective translation attempts that do not converge to a common translation answer for the monolingual structure.

9. A method as recited in claim 1, wherein the providing feedback includes creating a learning model based on each translation attempt from each of the plurality of players that is updated with each response pair from each of the plurality of players and steers each of the plurality of players towards a converging to a common translation answer for the monolingual structure.

10. A method of generating alternate translations for a statistical machine translation database through a game, the method comprising:
    providing a monolingual structure to a player;
    receiving a first translation attempt from the player;
    comparing, using a processor, the first translation attempt from the player to a reference translation;
    providing feedback to the player; and
    receiving and comparing attempts and providing feedback to iteratively converge subsequent translations from the player into a final translated structure.

11. A method as recited in claim 10, wherein the providing feedback includes providing a game manager to ensure that the player does not diverge in his translation.

12. A method as recited in claim 10, further comprising filtering parallel data for useful intermediate translation data.

13. A method as recited in claim 10, wherein the monolingual structure comprises a sentence formed in a first language.

14. A method as recited in claim 10, wherein the final translated structure comprises a sentence formed in a second language.

15. A method as recited in claim 10, wherein the comparing includes determining a similarity score of a translation attempt of the player to the reference translation.

16. A method of grading a statistical machine translation database through a game, the method comprising:
    providing a monolingual structure to a plurality of players;
    receiving a grading assessment of the monolingual structure from each of the plurality of players;
    comparing, as executed by a processor, the grading assessment from each of the plurality of players; and
    providing feedback to each of the plurality of players; and
    receiving and comparing attempts and providing feedback to iteratively converge subsequent translations from each of the plurality of players into a final grading assessment.

17. An apparatus to generate a statistical machine translation database through a game, the apparatus comprising:
    a monolingual database to store a plurality of language phrases first language; and
    a game manager, as executed by a processor on said apparatus, configured to receive a source language phrase from the monolingual database and present the source language phrase to each of a plurality of players and to receive translation attempts from each of the plurality of players,
    wherein the game manager provides feedback to each of the plurality of players, and wherein the game manager receives and compares attempts and provides feedback to iteratively converge subsequent translations from each of the players into a second language phrase.

18. An apparatus as recited in claim 17, further comprising a training player models unit to use the translation attempts to create a player-pair model to steer the plurality of players towards a converging to a second language phrase.

19. An apparatus as recited in claim 18, further comprising a response generation unit configured to formulate a response to the plurality of players to guide the plurality of players to converge to the second language phrase based on the player-pair model.

20. An apparatus as recited in claim 17, further comprising a response generation unit configured to formulate a response to the plurality of players to guide the plurality of players to converge to the second language phrase.

21. An apparatus as recited in claim 17, further comprising a game state unit to keep track of statuses of the translation attempts of the plurality of players to make sure that the players do not diverge in their respective translation attempts.

22. An apparatus as recited in claim 17, further comprising a parallel data filtering unit to filter useful parallel data from the translation attempts of the players and sending the useful parallel data to a parallel data database.

* * * * *